United States Patent
Ito et al.

(10) Patent No.: US 9,868,819 B2
(45) Date of Patent: Jan. 16, 2018

(54) METHOD FOR PRODUCING A POLYDIOXOLANE

(71) Applicant: MITSUBISHI GAS CHEMICAL COMPANY, INC., Tokyo (JP)

(72) Inventors: Akira Ito, Mie (JP); Hiroyuki Teramoto, Mie (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/903,366

(22) PCT Filed: Jul. 3, 2014

(86) PCT No.: PCT/JP2014/067744
§ 371 (c)(1),
(2) Date: Jan. 7, 2016

(87) PCT Pub. No.: WO2015/005206
PCT Pub. Date: Jan. 15, 2015

(65) Prior Publication Data
US 2016/0145383 A1    May 26, 2016

(30) Foreign Application Priority Data
Jul. 12, 2013  (JP) ................................ 2013-146635

(51) Int. Cl.
C08G 59/68    (2006.01)
C08G 65/16    (2006.01)
C08G 2/06     (2006.01)
C08G 4/00     (2006.01)

(52) U.S. Cl.
CPC ............... *C08G 65/16* (2013.01); *C08G 2/06* (2013.01); *C08G 4/00* (2013.01)

(58) Field of Classification Search
CPC .................................... C08G 2/10; C08G 4/00
See application file for complete search history.

(56) References Cited

U.S. PATENT DOCUMENTS

| | | |
|---|---|---|
| 5,166,224 A | 11/1992 | Collins et al. |
| 5,412,042 A | 5/1995 | Collins et al. |
| 5,741,866 A | 4/1998 | Yahiro et al. |
| 5,747,602 A | 5/1998 | Namba et al. |
| 5,837,781 A | 11/1998 | Tanimura et al. |
| 6,506,838 B1 | 1/2003 | Seyama |
| 6,756,475 B2 | 6/2004 | Mours et al. |
| 8,912,258 B2 | 12/2014 | Kobayashi et al. |
| 2003/0018104 A1 | 1/2003 | Mours et al. |
| 2003/0125512 A1* | 7/2003 | Nakamura ............... C08G 2/18 528/425 |
| 2009/0312466 A1 | 12/2009 | Hase |
| 2013/0062550 A1 | 3/2013 | Kobayashi et al. |

FOREIGN PATENT DOCUMENTS

| | | |
|---|---|---|
| CN | 1398273 | 2/2003 |
| CN | 101525404 | 9/2009 |
| CN | 102782041 | 11/2012 |
| JP | 7-41532 | 2/1995 |
| JP | 07-233230 | 9/1995 |
| JP | 07-286023 | 10/1995 |
| JP | 08-20714 | 1/1996 |
| JP | 8-27266 | 1/1996 |
| JP | 2000-119356 | 4/2000 |
| JP | 2001-011144 | 1/2001 |
| JP | 2001-192427 | 7/2001 |
| JP | 2003-246857 | 9/2003 |

OTHER PUBLICATIONS

International Search Report issued in PCT/JP2014/067744, dated Oct. 7, 2014.
Extended European Search Report issued in Patent Application No. 14822990.9, dated Feb. 1, 2017.
Williams et al., "Polymerization-depolymerization of 1,3-dixolane"; Polymer, vol. 33, No. 21; Nov. 15, 1992;pp. 4630-4634.
Chinese Search Report issued in Patent Application No. 2014800380615, dated Nov. 14, 2016.
Japanese Office Action issued in Counterpart Patent Appl. No. 2015-526290, dated May 16, 2017, along with an English translation thereof.
Chwialkowska et al., "Preparation of Living Mono-and Dicationically Growing Polyacetals and Attempts to prepare Block Copolymers thereof"; Die Makromolekulare Chemie, vol. 183, No. 4; Apr. 30, 1982; pp. 753-769.
Chinese Office Action issued in Counterpart Patent Appl. No. 201480038061.5, dated Aug. 2, 2017, along with an english translation thereof.

* cited by examiner

*Primary Examiner* — Shane Fang
(74) *Attorney, Agent, or Firm* — Greenblum & Bernstein, P.L.C.

(57) ABSTRACT

The present invention provides a method for producing a polydioxolane, which includes polymerizing a 1,3-dioxolane compound represented by the formula (1) in the presence of a cationic catalyst and a sterically hindered phenol in an amount of 10 to 1,500 ppm, based on the 1,3-dioxolane compound. In the formula (1), R1 to R6 are the same or difference and each independently represents a hydrogen atom, an alkyl group, an aryl group, a hydroxyalkyl group, an alkyloxy group, or an aryloxy group.

6 Claims, No Drawings

METHOD FOR PRODUCING A POLYDIOXOLANE

FIELD OF THE INVENTION

The present invention relates to a method for producing a polyether polymer. More particularly, the present invention is concerned with a method for producing a polyether polymer from a cyclic formal as a raw material.

BACKGROUND ART

A polyether polymer having a high molecular weight obtained by polymerizing a cyclic formal using a cationic catalyst is generally soluble in warm water, and has fluidity at a temperature relatively close to room temperature despite having a high molecular weight, and can be processed into a flexible film. Therefore, as a use of the polyether polymer utilizing this feature, a number of uses, such as a packaging material, a fiber treatment agent, a thickener, a plasticizer, and further a heat transfer medium and a lubricant, are considered.

With respect to the method for producing a high molecular-weight polyether polymer, a method using 1,3-dioxolane as a main monomer and a composite polymerization catalyst comprising a heteropolyacid and a carbonyl compound has been described (see, for example, Japanese Unexamined Patent Publication No. Hei 7-41532). The use of a catalyst containing only a heteropolyacid requires a prolonged polymerization time and further cannot satisfactorily increase the number average molecular weight, and, when the amount of the catalyst used is increased, the temperature in the polymerization system is rapidly increased, so that the resultant polymer has a lowered molecular weight. Therefore, the use of a composite polymerization catalyst is considered effective in the above method. Further, there have been described a method in which 1,3-dioxolane and trioxane are subjected to copolymerization while controlling the temperature during the polymerization so as not to be too high to obtain a high molecular-weight polymer (see, for example, Japanese Unexamined Patent Publication No. 2003-246857) and a method in which 1,3-dioxolane and 1,3-dioxepane are subjected to copolymerization (see, for example, U.S. Pat. Nos. 5,166,224 and 5,412,042).

PRIOR ART REFERENCES

Patent Documents

Patent document 1: Japanese Unexamined Patent Publication No. Hei 7-41532
Patent document 2: Japanese Unexamined Patent Publication No. 2003-246857
Patent document 3: U.S. Pat. No. 5,166,224
Patent document 4: U.S. Pat. No. 5,412,042

SUMMARY OF THE INVENTION

Problems to be Solved by the Invention

However, in the prior art methods for producing a polyether polymer, the effect of increasing the molecular weight is limited, and a further improvement of the effect has been desired. Accordingly, a task of the present invention is to provide a method for producing a polydioxolane, which can produce a high molecular-weight polydioxolane by polymerizing a 1,3-dioxolane compound in the presence of a cationic catalyst.

Means to Solve the Problems

The present inventors have conducted extensive and intensive studies. As a result, it has been found that the method shown below can achieve the task, and the present invention has been completed.

Specifically, the present invention is a method for producing a polydioxolane, which includes polymerizing a 1,3-dioxolane compound represented by formula (1) in the presence of a cationic catalyst and a sterically hindered phenol in an amount of 10 to 1,500 ppm, based on the 1,3-dioxolane compound:

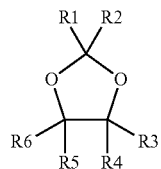

Formula (1)

wherein R1 to R6 are the same or different and each independently represents a hydrogen atom, an alkyl group, an aryl group, a hydroxyalkyl group, an alkyloxy group, or an aryloxy group.

Effect of the Invention

According to the present invention, there can be provided a method for producing a polydioxolane, which can produce a high molecular-weight polydioxolane by subjecting a 1,3-dioxolane compound to polymerization in the presence of a cationic catalyst.

EMBODIMENTS TO CARRY OUT THE INVENTION

In the present specification, the term "step" includes not only an independent step but also a step in which the anticipated effect of this step is achieved, even if the step cannot be clearly differentiated from the other steps. The range of values expressed using "to" indicates a range which includes the figures shown before and after "to" as, respectively, the minimum value and the maximum value. Further, with respect to the amount of a component contained in the composition, when a plurality of materials are present in the composition as the components of the composition, the amount of the components means the total amount of the materials present in the composition unless otherwise specified.

Further, "ppm" is given by mass unless otherwise specified.

The present invention is a method for producing a polydioxolane by cationically polymerizing a 1,3-dioxolane compound represented by the formula (1) as a monomer, characterized in that the polymerization reaction is conducted while mixing the 1,3-dioxolane compound, a cationic catalyst, and a sterically hindered phenol.

Specifically, the method for producing a polydioxolane of the present invention includes polymerizing a 1,3-dioxolane compound represented by the formula (1) in the presence of a cationic catalyst and a sterically hindered phenol in an amount of 10 to 1,500 ppm, based on the 1,3-dioxolane compound.

The 1,3-dioxolane compound represented by the formula (1) used as a monomer is representatively unsubstituted 1,3-dioxolane, or a 1,3-dioxolane compound substituted with an organic group, such as an alkyl group, an aryl group, a hydroxyalkyl group, an alkyloxy group, or an aryloxy group.

Examples of alkyl groups include linear or branched alkyl groups having 1 to 6 carbon atoms, and linear or branched alkyl groups having 1 to 4 carbon atoms are preferred. Examples of aryl groups include aryl groups having 6 to 10 carbon atoms, and a phenyl group is preferred.

The alkyl group and aryl group may further have a substituent. Examples of substituents include alkoxy groups having 1 to 20 carbon atoms, aryl groups having 6 to 10 carbon atoms, aryloxy groups having 6 to 10 carbon atoms, and halogen atoms, such as fluorine, chlorine, and bromine. When the alkyl group or aryl group has a substituent, the number of substitution(s) is, for example, 1 to 4, preferably 1 to 2.

Examples of hydroxyalkyl groups include linear or branched hydroxyalkyl groups having 1 to 6 carbon atoms and having at least one hydroxyl group, and linear or branched alkyl groups having 1 to 4 carbon atoms and having at least one hydroxyl group are preferred.

The alkyl group in the alkyloxy group is similar to those mentioned above. The aryl group in the aryloxy group is similar to those mentioned above.

Two arbitrarily selected from R1 to R6 in the formula (1) may be bonded together to form a ring. When forming a ring, the formed ring is preferably a 3- to 6-membered aliphatic ring, more preferably a 5- or 6-membered aliphatic ring.

At least one of R1 to R6 is preferably a hydrogen atom, and four or more of R1 to R6 are more preferably a hydrogen atom.

Specific examples of the 1,3-dioxolane compounds represented by the formula (1) include unsubstituted 1,3-dioxolane, 2-methyl-1,3-dioxolane, 2-ethyl-1,3-dioxolane, 2-propyl-1,3-dioxolane, 2-butyl-1,3-dioxolane, 2,2-dimethyl-1,3-dioxolane, 2-phenyl-2-methyl-1,3-dioxolane, 4-methyl-1,3-dioxolane, 2,4-dimethyl-1,3-dioxolane, 2-ethyl-4-methyl-1,3-dioxolane, 4,4-dimethyl-1,3-dioxolane, 4,5-dimethyl-1,3-dioxolane, 2,2,4-trimethyl-1,3-dioxolane, 4-hydroxymethyl-1,3-dioxolane, 4-butyloxymethyl-1,3-dioxolane, 4-phenoxymethyl-1,3-dioxolane, 4-chloromethyl-1,3-dioxolane, and 1,3-dioxabicyclo[3.4.0]nonane, and preferred is at least one selected from the group consisting of these compounds.

Of these, unsubstituted 1,3-dioxolane is preferred, and has an advantage in that the polymerized polydioxolane has a satisfactorily high molecular weight such that the crystalline properties can be lowered.

In the method for producing a polydioxolane, the 1,3-dioxolane compounds represented by the formula (1) may be used individually or in combination. When using the two or more 1,3-dioxolane compounds, unsubstituted 1,3-dioxolane and another 1,3-dioxolane compound being different from this and having a substituent are preferably used in combination.

When unsubstituted 1,3-dioxolane and another 1,3-dioxolane compound are used in combination, the ratio between them is not particularly limited and can be appropriately selected depending on, e.g., the purpose.

In the method for producing a polydioxolane, if necessary, a monomer other than the 1,3-dioxolane compound represented by the formula (1) may be used. Examples of other monomers include trioxane which is a cyclic trimer consisting of formaldehyde, tetraoxocane which is a cyclic tetramer, ethylene oxide, propylene oxide, butylene oxide, epichlorohydrin, styrene oxide, oxirane, oxetane, tetrahydrofuran, and oxepane, and at least one selected from the group consisting of these compounds is preferably used.

When a monomer other than the 1,3-dioxolane compound represented by the formula (1) is used, the amount of the other monomer is preferably less than 100 parts by mass, further preferably less than 20 parts by mass, relative to 100 parts by mass of the 1,3-dioxolane compound represented by the formula (1).

The 1,3-dioxolane compound represented by the formula (1) used in the method for producing a polydioxolane may contain an impurity. Impurities which can be contained in the 1,3-dioxolane compound represented by the formula (1), such as water, formic acid, methanol, and formaldehyde, are inevitably formed during the production of the compound, and the total amount of the impurities is preferably 100 ppm or less, more preferably 70 ppm or less, most preferably 50 ppm or less, based on the 1,3-dioxolane compound represented by the formula (1).

With respect to the cationic catalyst, there is no particular limitation as long as it is a compound which can cationically polymerize the 1,3-dioxolane compound, and one appropriately selected from cationic catalysts generally used can be used. The cationic catalyst is preferably at least one selected from the group consisting of superstrong acids, such as a heteropolyacid, an isopolyacid, a perfluoroalkylsulfonic acid, and derivatives thereof.

Examples of heteropolyacids include phosphotungstic acid, phosphomolybdic acid, phosphomolybdotungstic acid, phosphomolybdovanadic acid, phosphomolybdotungstovanadic acid, phosphotungstovanadic acid, silicomolybdic acid, silicotungstic acid, silicomolybdotungstic acid, and silicomolybdotungstovanadic acid. Of these, preferred is at least one selected from the group consisting of phosphomolybdic acid, phosphotungstic acid, silicomolybdic acid, and silicotungstic acid. Further, acid salts in such a form that a part of protons of the heteropolyacid is replaced by a metal cation, such as sodium, potassium, cesium, or rubidium, or a cation, such as an ammonium ion optionally having an aliphatic group or an aromatic group, can be used, and the above-mentioned heteropolyacids include these acid salts.

With respect to the heteropolyacid, those of an α0 type, a βII type, and a βIV type are generally known, and, from the viewpoint of the polymerization activity, those of an α0 type and a βIV type are preferred, and those of an α0 type are especially preferred.

Examples of isopolyacids include protonic acids prepared by various methods, e.g., a method in which a solution of a salt, such as an isopolymolybdate, an isopolytungstate, or an isopolyvanadate, is treated with an ion-exchange resin, or a method in which a mineral acid is added to the concentrated salt solution and the resultant mixture is extracted with an ether. Examples of these protonic acids include isopolytungstic acids, such as paratungstic acid and metatungstic acid; isopolymolybdic acids, such as paramolybdic acid and metamolybdic acid; and isopolyvanadic acids, such as metapolyvanadic acid. Further, acid salts in such a form that a part of protons of the isopolyacid is replaced by a metal cation, such as sodium, potassium, cesium, or rubidium, or a cation, such as an ammonium ion optionally having an aliphatic group or an aromatic group, can be used, and the above-mentioned isopolyacids include these acid salts.

Examples of perfluoroalkylsulfonic acids include trifluoromethanesulfonic acid, pentafluoroethanesulfonic acid, heptafluoropropanesulfonic acid, nonafluorobutanesulfonic acid, undecafluoropentanesulfonic acid, and perfluoroheptanesulfonic acid. Further, a perfluoroalkylsulfonic anhydride can also be used. Specific examples of perfluoroalkylsulfonic anhydrides include trifluoromethanesulfonic anhydride, pentafluoroethanesulfonic anhydride, and heptafluoropropanesulfonic anhydride. Further, a perfluoroalkylsulfonic acid derivative can also be used. Specific examples of perfluoroalkylsulfonic acid derivatives include perfluoroalkylsulfonates, such as methyl trifluoromethanesulfonate, ethyl trifluoromethanesulfonate, methyl pentafluoroethanesulfonate, and methyl heptafluoropropanesulfonate.

Of these, phosphotungstic acid which is one of the heteropolyacids is preferably used.

The cationic catalysts may be used individually or in combination.

The amount of the cationic catalyst used is preferably 10 to 1,000 ppm, more preferably 20 to 500 ppm, further preferably 20 to 300 ppm, especially preferably 20 to 100 ppm, based on the total mass of the all monomers.

The cationic catalyst is preferably added to a polymerizer in an independent form or in the form of a solution. When the cationic catalyst is used in the form of a solution, examples of solvents for the solution include inert organic solvents each of which does not adversely affect the polymerization, and in which the catalyst is soluble, such as ethers, esters, ketones, aliphatic hydrocarbons, aromatic hydrocarbons, and halogenated hydrocarbons, and preferred is at least one selected from the group consisting of these solvents. Alternatively, the 1,3-dioxolane compound represented by the formula (1) which is a raw material monomer may be used as a solvent. The cationic catalyst in an independent form or in the form of a solution is preferably added through an inlet of a polymerizer.

Examples of stericallyhindered phenols include dibutylhydroxytoluene, triethylene glycol-bis-3-(3-t-butyl-4-hydroxy-5-methylphenyl)propionate, pentaerythrityl-tetrakis-3-(3,5-di-t-butyl-4-hydroxyphenyl)propionate, hexamethylenebis[3-(3,5-di-t-butyl-4-hydroxyphenyl)propionate], 2,2'-methylenebis(6-t-butyl-4-methylphenol), 3,9-bis {2-[3-(3-t-butyl-4-hydroxy-5-methylphenyl)propionyloxy]-1,1-dimethylethyl}-2, 4,8,10-tetraoxaspiro[5.5] undecane, N,N'-hexane-1,6-diylbis[3-(3,5-di-t-butyl-4-hydroxyphenyl)propionamide], and 1,6-hexanediyl3,5-bis (1,1-dimethylethyl)-4-hydroxybenzenepropionate, and preferred is at least one selected from the group consisting of these compounds. Of these, more preferred is at least one selected from the group consisting of dibutylhydroxytoluene, triethylene glycol-bis-3-(3-t-butyl-4-hydroxy-5-methylphenyl)propionate, pentaerythrityl-tetrakis-3-(3,5-di-t-butyl-4-hydroxyphenyl)propionate, and 3,9-bis{2-[3-(3-t-butyl-4-hydroxy-5-methylphenyl)propionyloxy]-1,1-dimethylethyl}-2,4,8,10-tetraoxaspiro[5.5]undecane, and triethylene glycol-bis-3-(3-t-butyl-4-hydroxy-5-methylphenyl)propionate is most preferably used.

The sterically hindered phenols may be used individually or in combination.

The amount of the sterically hindered phenol used is 10 to 1,500 ppm, preferably 10 to 1,000 ppm, more preferably 50 to 1,000 ppm, further preferably 100 to 1,000 ppm, especially preferably 200 to 800 ppm, based on the mass of the 1,3-dioxolane compound represented by the formula (1). When the amount of the sterically hindered phenol is smaller than the above range, a satisfactory molecular weight increasing effect expected by the addition of the sterically hindered phenol may not be obtained. Conversely, when the amount of the sterically hindered phenol is larger than the above range, a lowering of the reaction rate may occur.

With respect to the molecular weight increasing effect due to the addition of the sterically hindered phenol, a higher effect can be obtained in the system using the cationic catalyst in the range of from 10 to 1,000 ppm as mentioned above. That is, the mass ratio of the sterically hindered phenol to the cationic catalyst (sterically hindered phenol/cationic catalyst) is preferably 0.1 to 100, more preferably 1 to 80, further preferably 10 to 50.

The sterically hindered phenol is preferably added to a polymerizer in an independent form or in the form of a solution. When the sterically hindered phenol is used in the form of a solution, examples of solvents for the solution include aliphatic hydrocarbons, such as hexane, heptane, and cyclohexane; aromatic hydrocarbons, such as benzene, toluene, and xylene; and halogenated hydrocarbons, such as methylene dichloride and ethylene dichloride, and preferred is at least one selected from the group consisting of these compounds. Alternatively, the 1,3-dioxolane compound represented by the formula (1) which is a raw material monomer may be used as a solvent. For maintaining the activity of the sterically hindered phenol during the polymerization reaction, the sterically hindered phenol in an independent form or in the form of a solution is desirably added through an inlet of a polymerizer.

With respect to the polymerization step, there is no particular limitation as long as it is possible to achieve conditions such that a raw material, such as the 1,3-dioxolane compound represented by the formula (1), can be satisfactorily mixed to cause a ring-opening polymerization, and, for example, a batch reaction or a continuous reaction can be used. In the case of a continuous reaction, the polymerization is preferably performed inside a kneader having a blade having at least two horizontal rotating shafts, each rotating shaft having incorporated a screw or a paddle, or a static mixer.

The polymerization step is preferably performed in an inert atmosphere, such as a nitrogen atmosphere. A solution polymerization which is conducted in the presence of a solvent can be employed, but a bulk polymerization which is substantially free of a solvent is preferred because the recovery cost for solvent is not required and a higher effect of the sterically hindered phenol is obtained. When a solvent is used, examples of solvents include aliphatic hydrocarbons, such as hexane, heptane, and cyclohexane; aromatic hydrocarbons, such as benzene, toluene, and xylene; and halogenated hydrocarbons, such as methylene dichloride and ethylene dichloride. The wording "substantially free of a solvent" means that the amount of the solvent added is 5% by mass or less, based on the mass of the raw material monomer, and the amount of the solvent is preferably 1% by mass or less.

The polymerization time is generally 1 to 120 minutes, preferably 1 to 60 minutes, more preferably 1 to 30 minutes. When the polymerization time is 120 minutes or less, the productivity is improved, and, when the polymerization time is 1 minute or more, the polymerization yield is improved.

When the polymerization temperature is too high, there is a possibility that depolymerization is caused to lower the molecular weight, and therefore the polymerization temperature is preferably 0 to 100° C. When the polymerization temperature is 0° C. or higher, a satisfactory polymerization yield is achieved.

With respect to the pressure in the polymerization step, the polymerization is conducted under a pressure in the range of from atmospheric pressure to a certain pressure applied, generally in the range of from atmospheric pressure to 2 MPa. When the temperature in the system rises and exceeds the boiling point of the dioxolane compound, the dioxolane compound volatilizes, leading to a loss of the compound. Therefore, in the case of the polymerization under atmospheric pressure, it is preferred that the polymerization reaction is efficiently advanced under reflux inside the system using a condenser provided, or applying a pressure to the system so that the dioxolane compound is maintained in a liquid state even at 100° C.

According to the present invention, the molecular weight can be easily increased, as compared to that in the case where the sterically hindered phenol is not added.

In the polymerization step, it is preferred to mix the inside of the system. As a method for mixing the inside of the system, mechanical agitation using, for example, a rotating vane, blade, or paddle, or a method of statically mixing the inside while continuously flowing it using a static mixer can be employed. When the inside of the system is not satisfactorily mixed, it is likely that an increase of the molecular weight due to progress of the polymerization reaction raises the viscosity in the system, so that the diffusion control causes feeding of the monomer to the reaction active site to become unsatisfactory, lowering the reaction rate. In addition, the stored heat may cause the reaction to run away, so that the temperature in the system becomes too high, conversely lowering the molecular weight.

It is preferred to provide a step of terminating the polymerization reaction after the polymerization step.

The termination of the polymerization reaction is conducted by, for example, contacting a polymerization terminator with the reaction product. The polymerization terminator can be used as such or in the form of a solution or a suspension. The contacting method is preferably made by continuously adding a small amount of a polymerization terminator or a solution or suspension thereof to the reaction system to contact the terminator with the reaction product. Upon contacting, the contact-efficiency is preferably increased by stirring.

Examples of polymerization terminators include trivalent organophosphorus compounds, organic amine compounds, and hydroxides of an alkali metal or an alkaline earth metal, and at least one selected from the group consisting of these compounds can be preferably used. Examples of organic amine compounds used as a polymerization terminator include primary, secondary, and tertiary aliphatic amines and aromatic amines, and heterocyclic amines. Specific examples include ethylamine, diethylamine, triethylamine, mono-n-butylamine, di-n-butylamine, tripropylamine, tri-n-butylamine, N,N-dimethylbutylamine, aniline, diphenylamine, pyridine, piperidine, morpholine, melamine, methylolmelamine, and various types of hindered amines, and at least one selected from the group consisting of these amines can be preferably used.

Examples of trivalent organophosphorus compounds include trialkylphosphines, such as tributylphosphine, tri-t-butylphosphine, and tricyclohexylphosphine, and triarylphosphines, such as triphenylphosphine and tris(4-methylphenyl)phosphine, and at least one selected from the group consisting of these compounds can be preferably used.

Among the above exemplified polymerization terminators, preferred is at least one selected from the group consisting of trivalent organophosphorus compounds and tertiary amines. Of the trivalent organophosphorus compounds, an especially preferred compound is triphenylphosphine which is thermally stable and does not cause the shaped article to suffer discoloration due to heat. Of the tertiary amines, especially preferred compounds are triethylamine and N,N-dimethylbutylamine.

The molar amount of the polymerization terminator used is generally 0.01 to 500 times, preferably 0.05 to 100 times the mole of the catalyst used.

When the polymerization terminator is used in the form of a solution or a suspension, there is no particular limitation with respect to the solvent used. Examples of solvents include water, an alcohol, a raw material monomer, a comonomer, and various aliphatic or aromatic organic solvents, such as acetone, methyl ethyl ketone, hexane, cyclohexane, heptane, benzene, toluene, xylene, methylene dichloride, and ethylene dichloride. These can be used in combination.

To the obtained polydioxolane, if necessary, for example, an antioxidant, a heat stabilizer, a coloring agent, a nucleating agent, a fluorescent brightening agent, a lubricant, a release agent, an antistatic agent, an ultraviolet light absorber, a light stabilizer, a thermoplastic resin, or an inorganic filler may be added. The above additive is preferably added after termination of the polymerization reaction or later, and the method for adding the additive may be either in a batch-wise manner or in a continuous manner.

EXAMPLES

Hereinbelow, the present invention will be described in more detail with reference to the following Examples, which should not be construed as limiting the scope of the present invention.

Examples 1 to 5 and Comparative Examples 1 to 5

Using, as a polymerization apparatus, a bench twin-shaft kneader having an inner capacity of 1 L and having a jacket and two Z-type blades, a polymerization in a batch-wise manner was conducted. Hot water at 50° C. was circulated through the jacket, and further the inside of the apparatus was heated and dried using high-temperature air, and then a cover was attached to the apparatus and the system was purged with nitrogen. 300 g of 1,3-dioxolane having a purity of 99.5% or more and containing water in an amount of less than 50 ppm, and a predetermined amount of triethylene glycol-bis-3-(3-t-butyl-4-hydroxy-5-methylphenyl)propionate as a sterically hindered phenol were charged through a raw material inlet, and, while stirring the resultant mixture by Z-type blades, a predetermined amount of phosphotungstic acid (manufactured by Wako Pure Chemical Industries, Ltd.) was added to the mixture to initiate a polymerization. After the polymerization was conducted for a predetermined period of time, triethylamine in a molar amount corresponding to 10 times the molar amount of the catalyst used was added to the polymerization apparatus, and mixed for 15 minutes to terminate the polymerization. The obtained polymerization product was recovered, and subjected to vacuum drying at 40° C. for one day to determine a yield. A number average molecular weight was measured by gel permeation chromatography using polystyrene as a standard substance and tetrahydrofuran as a solvent. The results are shown in Table 1.

TABLE 1

|  | Cationic catalyst (ppm) | Sterically hindered phenol (ppm) | Reaction time (min.) | Yield (%) | Number average molecular weight (Mn) |
|---|---|---|---|---|---|
| Example 1 | 505 | 500 | 12 | 75 | 29,500 |
| Example 2 | 241 | 500 | 13 | 66 | 45,800 |
| Example 3 | 156 | 500 | 14 | 69 | 54,800 |
| Example 4 | 72 | 500 | 26 | 72 | 60,200 |
| Example 5 | 26 | 500 | 38 | 71 | 93,100 |
| Comparative example 1 | 480 | 0 | 12 | 69 | 23,500 |
| Comparative example 2 | 251 | 0 | 13 | 74 | 25,300 |

TABLE 1-continued

|  | Cationic catalyst (ppm) | Sterically hindered phenol (ppm) | Reaction time (min.) | Yield (%) | Number average molecular weight (Mn) |
|---|---|---|---|---|---|
| Comparative example 3 | 129 | 0 | 19 | 66 | 27,400 |
| Comparative example 4 | 64 | 0 | 25 | 77 | 32,600 |
| Comparative example 5 | 31 | 0 | 53 | 68 | 59,400 |

As can be seen from Table 1, by producing a polydioxolane using the 1,3-dioxolane compound represented by the formula (1) as a raw material monomer and using a cationic catalyst in the presence of a sterically hindered phenol, a polyether polymer having a high number average molecular weight can be obtained even for the same reaction time.

Examples 6 to 10 and Comparative Examples 6 and 7

A polydioxolane was produced in substantially the same manner as mentioned above except that the amount of the cationic catalyst added was almost the same and that the type and amount of the sterically hindered phenol added were changed as shown in the table below. The conditions for reaction and the results as well as the results of Example 2 and Comparative Example 2 are shown in Table 2.

TABLE 2

|  | Cationic catalyst (ppm) | Sterically hindered phenol | | Reaction time (min.) | Yield (%) | Number average molecular weight (Mn) |
|---|---|---|---|---|---|---|
|  |  | Type | Amount (ppm) |  |  |  |
| Example 2 | 241 | a | 500 | 13 | 66 | 45,800 |
| Example 6 | 249 | a | 80 | 13 | 74 | 37,600 |
| Example 7 | 250 | a | 150 | 13 | 74 | 40,900 |
| Example 8 | 250 | a | 800 | 13 | 70 | 47,200 |
| Example 9 | 249 | b | 500 | 13 | 68 | 41,500 |
| Example 10 | 250 | c | 500 | 13 | 71 | 38,500 |
| Comparative example 2 | 251 | — | 0 | 12 | 13 | 25,300 |
| Comparative example 6 | 249 | a | 7 | 13 | 12 | 28,000 |
| Comparative example 7 | 250 | a | 2003 | 19 | 14 | 27,300 |
| Comparative example 8 | 249 | d | 502 | 25 | 13 | 27,100 |

The abbreviations used in Table 2 have the following meanings.
a: Triethylene glycol-bis-3-(3-t-butyl-4-hydroxy-5-methylphenyl)propionate
b: Pentaerythrityl-tetrakis-3-(3,5-di-t-butyl-4-hydroxyphenyl)propionate
c: Dibutylhydroxytoluene
d: Phenol As can be seen from Table 2, by producing a polydioxolane using the 1,3-dioxolane compound represented by the formula (1) as a raw material monomer and using a cationic catalyst in the presence of a predetermined amount of a sterically hindered phenol, a polyether polymer having a high number average molecular weight can be obtained. Further, it is found that when using simple phenol instead of the sterically hindered phenol, the effects of the present invention cannot be obtained.

The whole of the disclosure of Japanese Patent Application No. 2013-146635 is incorporated into the present specification by reference.

All the documents, patent applications, and technical standards described in the present specification are incorporated into the present specification by reference to the same extent as that in the case where it is specifically and individually shown that each of the documents, patent applications, and technical standards is incorporated into the present specification by reference.

The invention claimed is:

1. A method for producing a polydioxolane, the method comprising:
polymerizing 1,3-dioxolane in the presence of a cationic catalyst and a sterically hindered phenol in an amount of 80 to 800 ppm, based on the 1,3-dioxolane, wherein the 1,3-dioxolane is present in the range of 83% to 100% by mass based upon total mass of all monomers; and wherein the sterically hindered phenol is selected from the group consisting of triethylene glycol-bis-3-(3-t-butyl-4-hydroxy-5-methylphenyl)propionate, pentaerythrityl-tetrakis-3-(3,5-di-t-butyl-4-hydroxyphenyl)propionate, and dibutylhydroxytoluene.

2. The method for producing a polydioxolane according to claim 1, wherein the sterically hindered phenol is present in an amount of 200 to 800 ppm, based on the 1,3-dioxolane.

3. The method for producing a polydioxolane according to claim 1, wherein the sterically hindered phenol is triethylene glycol-bis-3-(3-t-butyl-4-hydroxy-5-methylphenyl)propionate.

4. The method for producing a polydioxolane according to claim 1, wherein the cationic catalyst is at least one selected from the group consisting of a heteropolyacid, an isopolyacid, a perfluoroalkylsulfonic acid, and a derivatives thereof, and wherein the cationic catalyst is present in an amount of 10 to 1,000 ppm, based on the total mass of all monomers.

5. The method for producing a polydioxolane according to claim 1, wherein the monomers include at least one monomer selected from the group consisting of trioxane, tetraoxocane, ethylene oxide, propylene oxide, butylene oxide, epichlorohydrin, styrene oxide, oxirane, oxetane, tetrahydrofuran and oxepane.

6. The method for producing a polydioxolane according to claim 1, wherein the 1,3-dioxolane is reacted in the absence of other monomers.

* * * * *